United States Patent [19]

Doi et al.

[11] 4,339,646
[45] Jul. 13, 1982

[54] COOKING OPERATION ANNOUNCEMENT MEANS OF MICROWAVE OVEN

[75] Inventors: Keiichiro Doi, Izumi; Minoru Makita, Higashiosaka; Masaaki Kowada, Kaizuka, all of Japan

[73] Assignee: Sharp Kabushiki Kaisha, Tokyo, Japan

[21] Appl. No.: 974,607

[22] Filed: Dec. 29, 1978

[30] Foreign Application Priority Data

Jul. 4, 1978 [JP] Japan .................................. 53-81764

[51] Int. Cl.³ ............................................. H05B 6/68
[52] U.S. Cl. ............................. 219/10.55 B; 200/46; 219/506; 235/449; 340/782
[58] Field of Search ............... 219/486, 489, 490, 491, 219/492, 493, 499, 509, 510, 10.55 B, 10.55 R; 200/46; 235/400, 419, 449; 99/325, 327, 332, 342, 335; 236/46 D, 46 F, 46 R; 340/782

[56] References Cited

U.S. PATENT DOCUMENTS

| | | | |
|---|---|---|---|
| 3,012,730 | 12/1961 | Codgan | 219/490 X |
| 3,031,558 | 4/1962 | Euler | 200/46 X |
| 3,349,369 | 10/1967 | Jensen | 235/449 X |
| 3,581,030 | 5/1971 | Sedley | 200/46 |
| 3,814,913 | 6/1974 | Ironside et al. | 219/492 |
| 3,837,568 | 9/1974 | Goodhouse et al. | 219/492 X |
| 3,845,275 | 10/1974 | Branson | 219/490 X |
| 3,849,622 | 11/1974 | Merriam | 219/10.55 E |
| 3,857,019 | 12/1974 | Holtey | 200/46 X |
| 3,886,453 | 5/1975 | Quintiliani et al. | 200/46 X |
| 3,965,322 | 6/1976 | Mori | 219/10.55 B |
| 3,974,472 | 8/1976 | Gould, Jr. | 219/506 X |
| 3,978,306 | 8/1976 | Mori | 219/10.55 B |
| 4,002,887 | 1/1977 | Ouimette | 235/449 |
| 4,011,428 | 3/1977 | Fosnougn et al. | 219/10.55 B |
| 4,102,492 | 7/1978 | Gold et al. | 200/46 X |
| 4,104,682 | 8/1978 | Lehner et al. | 235/449 X |
| 4,119,957 | 10/1978 | Sasaki et al. | 219/10.55 B |
| 4,155,084 | 5/1979 | Klees | 340/782 X |
| 4,158,759 | 6/1979 | Mason | 219/506 X |

OTHER PUBLICATIONS

Toshiba-ER-899 BT-1, "The Brainwave", 5/77.

Primary Examiner—Arthur T. Grimley
Attorney, Agent, or Firm—Birch, Stewart, Kolasch & Birch

[57] ABSTRACT

A heating appliance comprises a generation circuit of a magnetron for effecting a series of cooking operations at least one of which requires manual cooking operation by an operator adapted to a foodstuff therein and an indicator for announcing to the operator that the manual cooking operation is to be conducted concerning the foodstuff.

18 Claims, 9 Drawing Figures

COOKING OPERATION ANNOUNCEMENT MEANS OF MICROWAVE OVEN

BACKGROUND OF THE INVENTION

The present invention relates to a microwave oven in general and, more particularly, to a microwave oven including means for indicating to an operator the timing for effecting such manual cooking operations as stirring, turning-over, combining, seasoning operations at the like processed to a food cooked in the microwave oven.

A cooking program for controlling the cooking of food positioned in the microwave oven is adapted to include certain cooking operations which are conducted while the microwave oven is not energized.

OBJECTS AND SUMMARY OF THE INVENTION

Accordingly, it is the primary object of the present invention to provide a novel microwave oven where a food is processed in accordance with flexible cooking operations including manual operations by an operator which are suitable for the food.

It is another object of the present invention to provide a novel microwave oven including means for announcing to an operator the specific timing for performing the flexible cooking operations which are suitable to a foodstuff undergoing manual processing.

It is still another object of the present invention to provide a novel microwave oven responsive to a cooking program where at least one cooking operation is allocated so that an operator may conduct the one cooking operation on a food being processed in the microwave oven.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, there is provided in a heating appliance, for example, a microwave oven of the present invention, a generation circuit for effecting a cooking program including a series of manual cooking operations by an operator adapted for a food therein and an indicator for announcing to the operator the timing with which the manual cooking operations are to be conducted to suitably comply with the operator's recipe or cooking instructions for cooking. The generation circuit is responsive to a cooking program including at least one series of manual cooking operations so that the operator may perform the manual cooking operations on the food. The cooking program is recorded on a magnetic card in a preferred form of the present invention. Needless to say, the cooking program can be introduced into the generation circuit through the use of a keyboard means formed on the heating appliance of the present invention. The generation circuit controls the energization of a source of heating energy such as a magnetron in the microwave oven implemented within the heating appliance.

The cooking program includes program instructions introduced into the oven in accordance with instructions on a menu, a food, a timetable and so on. The heating appliance comprises a control panel including a card reader for reading the cooking program to enable the generation circuit in accordance with the cooking program. The generation circuit comprises a central processing unit (CPU) and a decoder for decoding the cooking program into a coded format applicable to the CPU. The CPU dominates the performance of the cooking program by controlling a plurality of circuit elements for operating the cooking program.

As the cooking program is advanced to reach the timing with which the series of manual cooking operations is processed, the indicator is activated under the control of the generation circuit for indicating to the operator the situation and the generation circuit stops the energization of the source of heating energy. The series of manual cooking operations is conducted by the operator during the time period when the heating appliance is not providing the heating energy. The source of heating energy is provided again in response to the activation of the heating appliance by the operator after the completion of the series of manual cooking operations. The generation circuit produces a control signal for re-activating the generation of the source of heating energy.

The term "manual cooking operations" as used herein, refers to, for example stirring operations where the food is stirred for uniforming purposes, turning-over operations where the food is turned over for exposing the opposing side of the food to the source of heating energy, combining operations where an auxiliary food is combined to the food previously cooked, and seasoning operations where condiments are added to the food for seasoning purposes, or the like.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DESCRIPTION OF THE PREFERRED EMBODIMENTS

Figure 1:
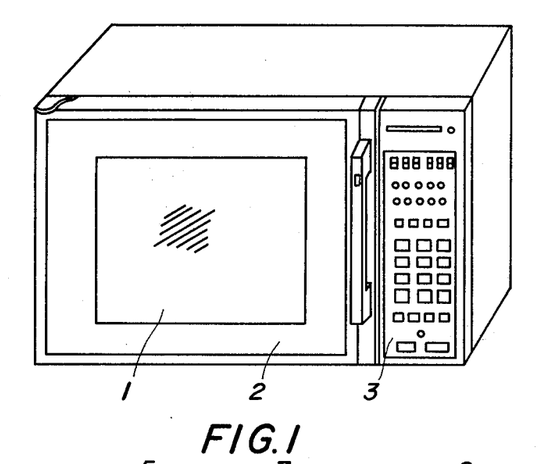
FIG. 1 is a perspective view of a microwave oven according to the present invention.

FIG. 1 shows a microwave oven 1 of the present invention in a perspective view, wherein a door 2 and a control panel 3 are provided. The control panel 3 will be described in detail hereinafter with reference to drawings.

Figure 2:
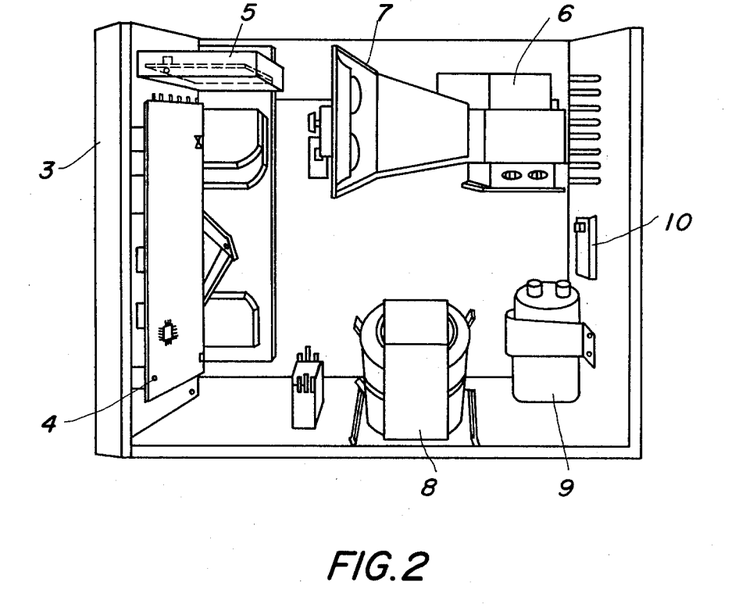
FIG. 2 is a right side view of the microwave oven shown in FIG. 1, the cabinet housing being omitted to more clearly show the interior arranged and electric parts involved in the microwave oven.

FIG. 2 shows the interior of the microwave oven 1 in the right side view. The microwave oven includes a printed circuit board 4 and a card reader 5 both behind the control panel 3, a magnetron 6, a cooling blower therefor, a high voltage transformer 8 for driving the magnetron 6, a high voltage condenser 9, and a diode 10. The printed circuit board 4 carries a plurality of electric elements including a plurality of large scale integrations which function as a central processing unit (CPU), a read only memory (ROM), a random access memory (RAM) and the like to provide a microcomputer.

Figure 3:
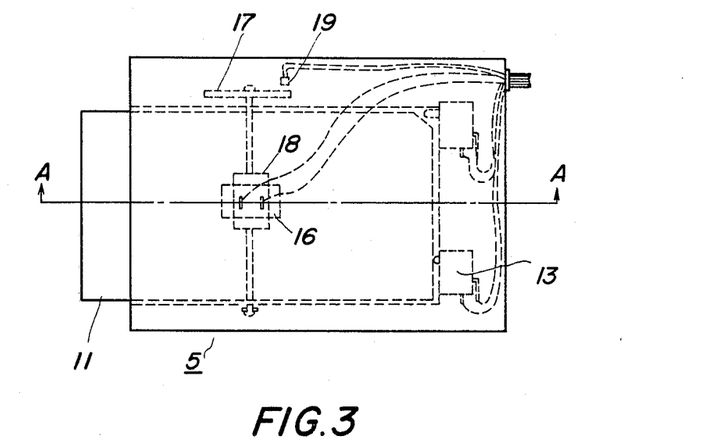
FIG. 3 is a plane view of a card reader adapted to the microwave oven illustrated in FIG. 1.
Figure 4:
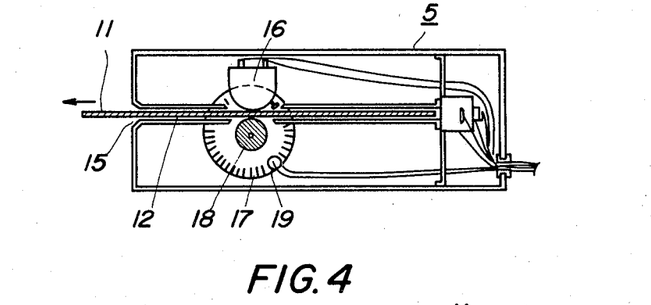
FIG. 4 is a cross-sectional view taken on line A—A in FIG. 3.

FIGS. 3 and 4 illustrate the card reader 5 in a plane view and a cross sectional view, respectively. In FIGS. 3 and 4, a magnetic card 11 is inserted into an inlet 15 and transferred to the inmost part thereof along a slide guide 12. The magnetic card 11 contains a cooking program in coded format processed on a food employed in the microwave oven 1. A detection switch 13 is provided at the inmost part for sensing the complete insertion of the magnetic card 11 into the inmost part to the thereby activate an indicator 14 (see FIG. 7) because the end portion of the magnetic card 11 presses against the detection switch at the inmost part. A magnetic head 16 is opposed to the magnetic card 11 as the magnetic card 11 is pulled-out along the slide guide 12 for reading purposes. The magnetic head 16 subsequently reads the cooking program recorded on a magnetic coating 11a (see FIG. 5) in a striped pattern of the magnetic card 11. A timing plate 17 provides a plurality of writing timing pulses in association with the rotation of a roller 18 using a photo coupler 19 as the magnetic card 11 is pulled out. As is noted according to the above description it is required for the present purposes that the magnetic head 16 is merely provided for reading the cooking program recorded on the magnetic card 11 in a conventional card reader.

Figure 5:
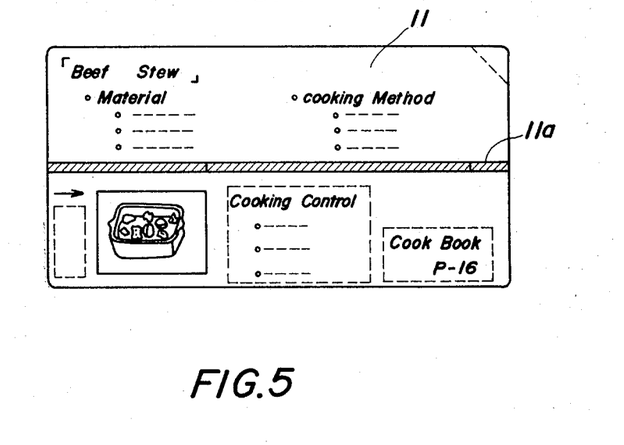
FIG. 5 is a front view of a magnetic card adapted to the card reader shown in FIG. 3.
Figure 6:
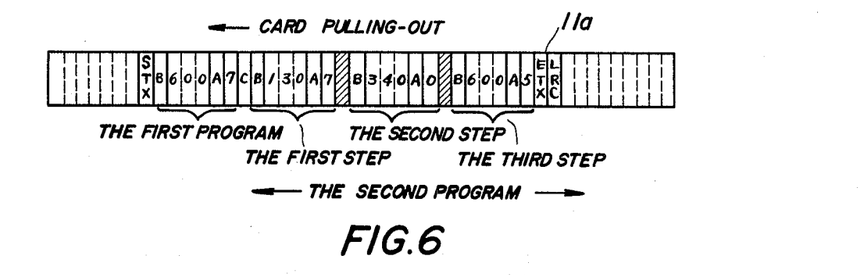
FIG. 6 is a schematic representation of a cooking program recorded on the magnetic card of FIG. 5.

FIG. 5 depicts a front view of the magnetic card 11 and FIG. 6 illustrates a schematic representation of the cooking program in alignment recorded on the magnetic coating, for example. With reference to FIG. 5, on the magnetic card 11 cooking information including a menu, a cooking material, and a cooking timetable correlated to the cooking program is stored on the magnetic card 11 and is printed for convenience.

In FIG. 6 the magnetic card 11 contains the cooking program wherein a roast of three pounds is defrosted in such a manner as described below.

|  | Cooking Time | Microwave Energy |
| --- | --- | --- |
| The First Cooking Program | 6 minutes | Roast 70% |
| Flexible Cooking Operation | | Turning Over Operation |
| The Second Cooking Program | | |
| The First Step | 1 minute and 30 seconds | Roast 70% |
| The Second Step | 3 minutes and 40 seconds | Hold 0% |
| The Third Step | 6 minutes | Simmer 50% |

The performance of the cooking program using the microwave oven 1 is conducted in accordance with cooking instructions allocated between "STX" representative of a program start signal and "ETX" representative of a program end signal. A data indication signal B is utilized for announcing the presence of cooking time data in the subsequent column. Another data indication signal A, on the other hand, is allocated for indicating the presence of microwave energy data in the subsequent column. An operation instruction signal C representing a turning over operation is recorded between the first and second cooking programs. The turning over operation is referred to in the cooking operation where the cooking material is to be turned over for assuring uniform heating of the same.

Figure 7:
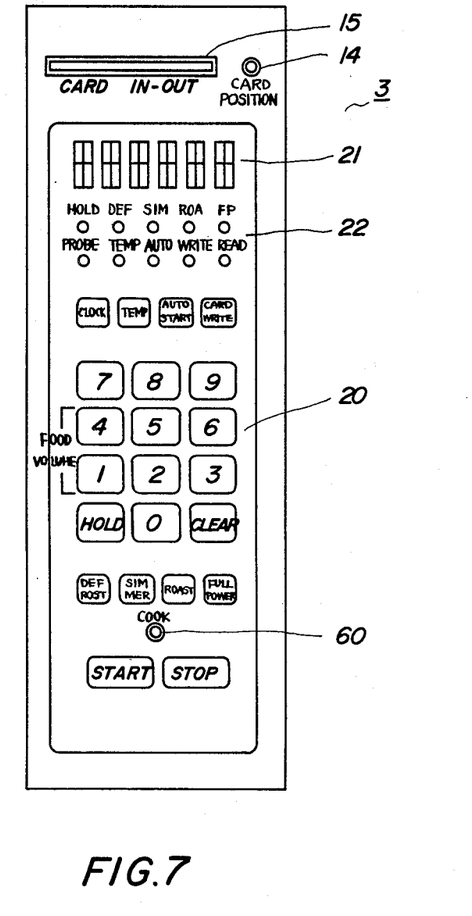
FIG. 7 is a front view of a control panel secured in the front cabinet housing of the microwave oven of FIG. 1.

FIG. 7 illustrates the control panel 3 in detail where there are provided the inlet 15 for the magnetic card 11, the indicator 14, a keyboard 20, a display 21, and an operation announcement means 22. The keyboard 20 includes numeral ten keys, output setting keys for controlling the microwave energy, developed by the magnetron 6 such as "DEFROST", "SIMMER" and the like, and operation instruction keys for controlling the energization of the magnetron 6 such as "START" and "STOP". The display 21 comprises six digits each consisting of a cross-in-square numeric configuration, which indicate the cooking time data or the like. The operation announcement means 22 are provided for indicating the operation conditions of the microwave oven 1.

The cooking program can be conducted in the microwave oven 1 using a plurality of keys of the keyboard 20 instead of the magnetic card 11 although a detail description therefor is omitted because it will be apparent to those skilled in the art.

Figure 8:
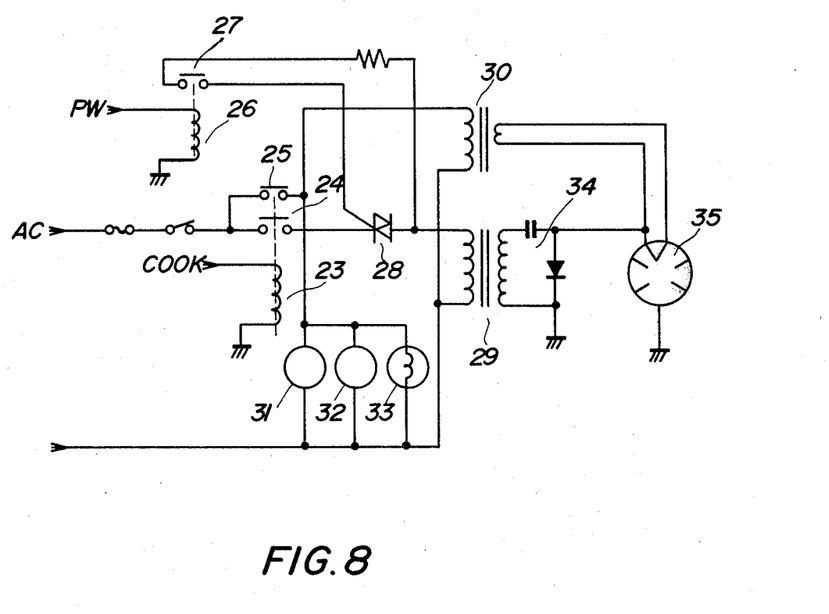
FIG. 8 is a circuit configuration of a generation circuit for a microwave generator implemented within the microwave oven of FIG. 1.

FIG. 8 depicts a generation control circuit implemented within the microwave oven 1. The generation circuit comprises two relays 23 and 26, three relay switches 24, 25 and 27 a triac 28, a high voltage transformer 29, a heater transformer 30, a blower motor 31, a stir fan motor 32, an oven lamp 33, a secondary rectifier circuit 34 and a magnetron 35. The control circuit functions to control the energization of the magnetron 35 in terms of the magnetic card 11.

The relay 23 is activated in response to a cooking signal COOK applied thereto so that it controls the opening and closing of the relay switches 24 and 25. The relay 26 is energized in response to a microwave output control signal PW impressed thereto so that it selects the opening and closing of the relay switch 27. The relay 26 controls the activation of the triac 28. The relay switch 24 functions to provide switching of an AC power (100 V) applied to the high voltage transformer 29 since the relay switch 24 is connected between the AC power and the triac 28. The relay switch 25, on the other hand, operates as switching for the heater transformer 30, the blower motor 31, the stir fan motor 32, and the oven lamp 33.

Assuming that the key "START" ON the control panel 3 is activated to provide the cooking signal COOK, the magnetron 35 receives a high voltage through the secondary rectifier circuit 34 of the high voltage transformer 29 to thereby develop microwave energy. The triac 28 activates intermittently in accordance with a duty of the microwave output control signal PW which are pulse signals. The magnetron 35 develops the microwave energy according to the intermittent ratio between 0% and 100%. The cooking signal COOK and the microwave output control signal PW are both generated according to a control circuit described below.

Figure 9:
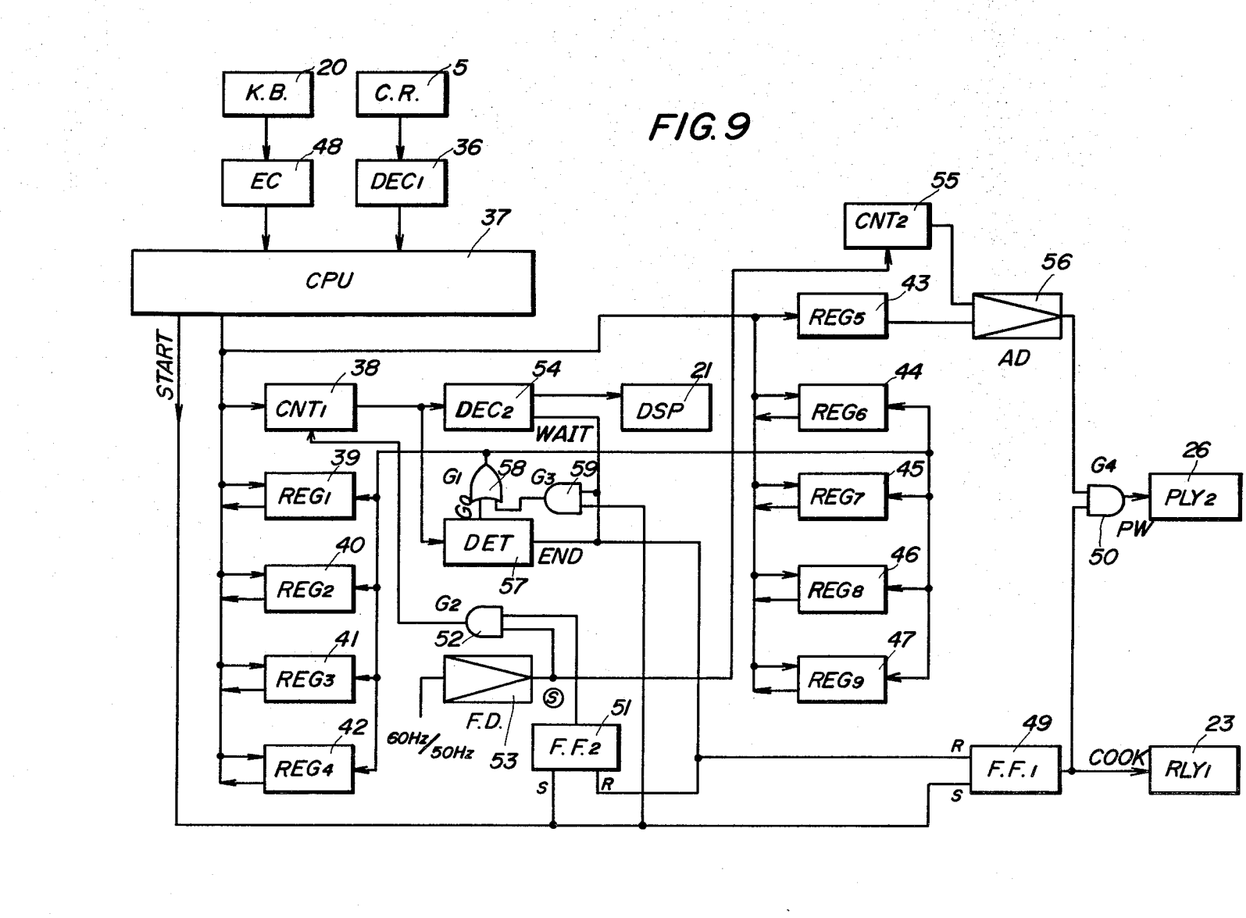
FIG. 9 is a block diagram of a control circuit for the generation circuit of FIG. 8.

FIG. 9 illustrates a block diagram of the control circuit for controlling the microwave oven 1. The configuration and function of the control circuit are described with reference to the exemplary cooking operation where the above-mentioned roast of three pounds is defrosted according to the cooking program previously mentioned.

The magnetic card 11 is drawn into the card reader 5 and then pulled out therefrom for reading purposes after the indicator 14 is illuminated. The magnetic head 16 reads the cooking program to thereby transfer the data to a decoder 36. The decoder 36 decodes the data to apply the cooking program to a central processing unit (CPU) 37. The cooking time information of 6 minutes in the first cooking program is applied to a counter 38 and the microwave energy information of 70% is transferred to a register 43. The operation instruction signal C is stored in a register 39. The operation instruction signal C represents the timing with which the energization of the microwave oven 1 is stopped and a visual display showing the performance of the turning over operation is provided.

Similarly, the cooking time information of 1 minute and 30 seconds at the first step in the second cooking program is stored in a register 40 and the microwave energy information of 70% therein is transferred to a register 45. The cooking time information of 3 minutes and 40 seconds at the second step in the second cooking program is applied to a register 41 and the microwave energy information of 0% therein is stored in a register 46. Lastly, the cooking time information of 6 minutes at the third step in the second cooking program is impressed to a register 42 and the microwave energy information of 50% therein is stored in a register 47.

Now assuming that the key START in the keyboard 20 is activated after the read operation of the magnetic card 11 is completed by pulling out the magnetic card 11 from the card reader 5, the start information according to the key START is decoded by an encoder 48 to be applied to the CPU 37. The CPU 37 develops a start signal START in response to the start information. A flip-flop 49 is allowed to set due to the start signal START.

The flip-flop 49 develops a cook signal COOK in its set condition and functions to generate signals for conducting an AND gate 50. The start signal START is also applied to a flip-flop 51 to thereby make an AND gate 52 conductive. A time keeping circuit 53 develops second signals s by dividing power frequency 50/60 Hz. The second signals s are impressed into the counter 38 when the AND gate 52 is allowed to be conductive by the flip-flop 51. The counter 38 operates count down operations according to the second signals s . The cook time information stored in the counter 38 is in turn counted down in each one second. The output developed from the counter 38 in its count down operations is converted to display information by a decoder 54 to enable the output in the display 21.

A counter 55 serves to repeat the count down operations at a predetermined frequency between a certain constant and zero in response to the second signals s generated from the time keeping circuit 53. The counter 55 develops the output which is applied to an adder 56 together with the output of a register 43. The adder 56 functions to add the microwave energy information stored in the register 43 to the output of the counter 55. Carry signals which are developed from the counter 55 in each frequency control the presence and absence of the output of the adder 56. Therefore, the AND gate 50 develops microwave energy control signal PW which a pulse signal having duties depending on the intermittent output of the adder 56.

The cook signal COOK is pulse signals having 6 minutes and the microwave energy control signal PW a pulse signal having a duty of 7/3 because in the first cooking program the cooking time is 6 minutes and the microwave energy information is concerned with 70%. The relay 26 (see FIGS. 8 and 9) receives the microwave energy control signal PW and the relay 23 (see FIGS. 8 and 9) has the cook signal COOK. Hence, the magnetron 35 is intermittently energized since it is operated for 7 seconds and stopped for 3 seconds over the cook time of 6 minutes. The microwave oven 1 is utilized for defrosting the roast of three pounds during the interval of 6 minutes using the microwave energy of 70%.

When the count down operations of the counter 38 are advanced so that 6 minutes has elapsed, the contents of the counter 38 become zero. A detection circuit 57 senses the zero condition of the counter 38 to thereby provide transference instruction signals GO to registers 39 and 40 through the conductance of an OR gate 58. Then the operation instruction signal C stored in the register 39 is transferred to the counter 38 and, simultaneously, the data stored in the register 44 are transmitted to the register 43. The operation instruction signal C contained with the counter 38 is decoded by decoder 54. The flip-flops 49 and 51, and an AND gate 59 have a temporarily-cooking stop signal WAIT.

The display 21 illuminates a visual indication "T-OVER" in response to the output of the decoder 54. The generation of the cook signal COOK is temporarily stopped through resetting the flip-flop 49 using the temporarily cooking stop signal WAIT. The flip-flop 51 makes the AND gate 52 non-conductive to provisionally restrict the flowing of the second signals s . The magnetron 35 stops its microwave energy generation where the display 21 indicates "T-OVER" display. An operator is in a position to open the door 2 according to the recognition of the indication "T-OVER" to turn over the cooking material for assuring the uniform heating.

The register 43 has the data transmitted from the register 44 although in this cooking program the register 44 is allowed to remain the absence. Since the AND gate 50 is non-conductive, the output generated from the adder 56 is not available at all thereby not providing the microwave output control signal PW.

When the operator has turned over the cooking material and, thereafter, positioned the same in the microwave oven 1 and activated the key START of the keyboard 20, the CPU 37 generates the start signal START again to set the flip-flops 49 and 51. The AND gate 59 develops its output using the temporarily-cooking stop signal WAIT and the start signal START. The output of the AND gate 59 is applied to the OR gate 58 so that the AND gate 59 provides the transference instruction signals GO to the registers 40 and 45 instead of the detection circuit 57.

The cooking time information of 1 minute and 30 seconds at the first step in the second cooking program stored in the register 40 is transferred into the counter 38. The microwave energy information of 70% therein stored in the register 45 is transmitted into the register 43. As is described above, the counter 38 serves to function the count down operations in turn in each one second and the adder 56 adds the microwave energy information contained in the register 43 and the contents of the counter 55.

In accordance the performance of the cooking program the contents of the counter 38 reaches the zero to provide the transference instruction signals GO from the detection circuit 57. Therefore, the cooking time and the microwave energy information concerning the second step in the second cooking program which are contained in the registers 41 and 46 are transferred into the counter 38 and the register 43, respectively. When the contents of the counter 38 attain to the zero in accordance with the second step of the second cooking program, the transference instruction signals GO are applied to each of the registers 42 and 47. Therefore, the cooking time and the microwave energy information regarding the third step in the second cooking program which are stored in the registers 42 and 47 are transmitted into the counter 38 and the register 43. End signals END are generated from the detection circuit 57 according to the completion of the first and second cooking programs wherein the contents of the counter 38 reaches the zero. The flip-flops 49 and 51 are reset by the end signals END. Therefore, the cook signal COOK is eliminated to make the relay 23 inoperative so that the relay switches 24 and 25 become non-conductive.

The AND gate 52 becomes non-conductive in response to the reset of the flip-flop 51 so that the microwave output control signal PW is not provided. When the first and second cooking programs are completed, the operation announcement means 22 of the control panel 3 are not illuminated to indicate to the operator the termination of the cooking program.

The invention being thus described, it will be obvious that the same may be varied in many ways. Such variations are not to be regarded as a departure from the spirit and scope of the invention, and all such modifications are intended to be included within the scope of the following claims.

What is claimed:

1. A heating appliance having an energizing means for starting the energization of said appliance in response to actuation thereof, comprising:
   input means for introducing a series of instructions into said heating appliance for controlling the operation of said heating appliance, said series of instructions including multiple sets of instructions;
   operating means responsive to energization of said appliance by said energizing means for operating said appliance in accordance with a first set of said instructions until said first set of instructions is fully executed; and
   terminating means responsive to the full execution of the first set of instructions by said operating means and the presence of a second set of said instructions at said input means for terminating the energization of said appliance in response thereto;
   said operating means being responsive to actuation of said energizing means and a further set of said instructions from said input means for operating said appliance in accordance therewith in the event that said second set of instructions has been executed by said heating appliance; and
   said operating means operating said appliance in accordance with said further set of instructions exclusive of said energizing means in the event that said second set of instructions has not been introduced into said heating appliance.

2. A heating appliance in accordance with claim 1 wherein said operating means comprises:
   energization signal generating means responsive to actuation of said energizing means for generating an energization signal to energize said heating appliance;
   first storage means for storing said first set of instructions;
   second storage means for storing said second and said further set of instructions; and
   means responsive to the contents of said first storage means for generating an energy control signal to control the energization of said heating appliance in accordance with said first set of instructions stored in said first storage means until the first set of instructions is fully executed.

3. A heating appliance in accordance with claim 2 wherein said terminating means further comprises:
   determination circuit means for determining whether said first set of instructions stored in said first storage means has been fully executed and for generating a determination output signal when said first set of instructions has been fully executed, said determination output signal transferring the second instruction from said second storage means to said first storage means; and
   detecting means for detecting the presence of said second set of instructions in said first storage means and for generating an energization termination signal in response thereto, said energization termination signal causing said energization signal generating means to terminate the generation of said energization signal thereby terminating the energization of said heating appliance.

4. A heating appliance in accordance with claim 3, wherein actuation of said energizing means following the termination of energization of said heating appliance in response to said energization termination signal transfers said further set of instructions from said second storage means to said first storage means and causes said energization signal generating means to commence the generation of said energization signal and the energization of said heating appliance, the energization of said heating appliance being controlled in accordance with said further set of instructions stored in said first storage means.

5. A heating appliance in accordance with claims 1 or 4 wherein said input means comprises card reading means for reading a series of digital codes on a card when said card is introduced into said card reading means, said series of digital codes including said first, said second, and said further set of instructions.

6. A heating appliance in accordance with claim 4 wherein:
   said first set of instructions includes an energization time and a percent of full energization;
   said first storage means includes,
      a counter means for storing said energization time therein in response to utilization of said input means, said counter means counting down from the full value of said energization time in response to actuation of said energizing means, and
      a register means for storing said percent of full energization therein and providing an output signal representative of said percent of full energization for controlling the magnitude of energization of said heating appliance.

7. A heating appliance in accordance with claim 6 wherein:
said second set of instructions introduced via said input means includes a stop instruction code;
said determination circuit means transfers said stop instruction code from said second storage means to said counter means when said counter means counts down the full value of said energization time; and
said detecting means detects the presence of said stop instruction code in said counter means and generates said energization termination signal in response thereto thereby terminating the energization of said heating appliance.

8. A heating appliance in accordance with claim 7 wherein:
said further set of instructions stored in said second storage means includes a further energization time and a further percent of full energization;
said further energization time is transferred from said second storage means to said counter means in response to actuation of said starting means;
said further percent of full energization is transferred from said second storage means to said register means in response to actuation of said starting means;
said counter means counts down the full value of said further energization time in response to actuation of said energizing means; and
said register means generates an output signal representative of said further percent of full energization for controlling the magnitude of energization of said heating appliance in response to actuation of said energizing means.

9. A heating appliance in accordance with claim 8 wherein said second storage means comprises:
first additional register means operatively connected to said counter means for storing said further energization time therein, said further energization time being transferred from said first additional register means to said counter means in response to actuation of said energizing means; and
second additional register means operatively connected to said register means for storing said further percent of full energization therein, said further percent of full energization being transferred from said second additional register means to said register means in response to actuation of said energizing means.

10. An oven having a starting means for initiating the energization of said oven in response to actuation thereof, comprising:
input means for introducing a series of instructions into said oven for controlling the operation of said oven, said series of instructions including multiple sets of instructions for operating said oven in a cooking mode, a non-cooking mode, and a continuing cooking mode;
operating means responsive to energization of said appliance by said starting means for operating said oven in said cooking mode in accordance with a first set of said instructions until said first set of instructions is fully executed; and
terminating means responsive to the full execution of the first set of instructions by said operating means and the presence of a second set of said instructions at said input means for terminating the energization of said oven and operating said oven in said non-cooking mode in response thereto;
said operating means being responsive to actuation of said starting means and a further set of said instructions from said input means for operating said oven in said continuing cooking mode in accordance with said further set of instructions in the event that said second set of instructions has been executed by said oven; and
said operating means operating said oven in accordance with said further set of instructions exclusive of the actuation of said starting means in the event that said second set of instructions has not been introduced into said oven.

11. An oven in accordance with claim 10 wherein said operating means comprises:
energization signal generating means responsive to actuation of said starting means for generating an energization signal to energize said oven;
first storage means for storing said first set of instructions;
second storage means for storing said second and said further set of instructions; and
means responsive to the contents of said first storage means for generating an energy control signal to control the energization of said oven in accordance with said first set of instructions stored in said first storage means until the first set of instructions is fully executed.

12. An oven in accordance with claim 11 wherein said terminating means further comprises:
determination circuit means for determining whether said first set of instructions stored in said first storage means has been fully executed and for generating a determination output signal when said first set of instructions has been fully executed, said determination output signal transferring the second instruction from said second storage means to said first storage means; and
detecting means for detecting the presence of said second set of instructions in said first storage means and for generating an energization termination signal in response thereto, said energization termination signal causing said energization signal generating means to terminate the generation of said energization signal thereby terminating the energization of said oven.

13. An oven in accordance with claim 12 wherein actuation of said starting means following the termination of energization of said oven in response to said energization termination signal transfers said further set of instructions from said second storage means to said first storage means and causes said energization signal generating means to commence the generation of said energization signal and the energization of said oven, the energization of said oven being controlled in accordance with said further set of instructions stored in said first storage means.

14. An oven in accordance with claims 10 or 13 wherein said input means comprises card reading means for reading a series of digital codes on a card when said card is introduced into said card reading means, said series of digital codes including said first, said second, and said further set of instructions.

15. An oven in accordance with claim 13 wherein:
said first set of instructions includes an energization time and a percent of full energization;

said first storage means includes,
  a counter means for storing said energization time therein in response to utilization of said input means, said counter means counting down from the full value of said energization time in response to actuation of said starting means, and
  a register means for storing said percent of full energization therein, an output signal from said register means being representative of said percent of full energization and controlling the magnitude of energization of said oven.

16. An oven in accordance with claim 15 wherein:
said second set of instructions introduced via said input means includes a stop instruction code;
said determination means transfers said stop instruction code from said second storage means to said counter means when said counter means counts down the full value of said energization time;
said detecting means detects the presence of said stop instruction code in said counter means and generates said energization termination signal in response thereto thereby terminating the energization of said oven.

17. A heating appliance in accordance with claim 16 wherein:
said further set of instructions stored in said second storage means includes a further energization time and a further percent of full energization;
said further energization time is transferred from said second storage means to said counter means in response to actuation of said starting means;
said further percent of full energization is transferred from said second storage means to said register means in response to actuation of said starting means;
said counter means counts down the full value of said further energization time in response to actuation of said starting means; and
said register means generates an output signal representative of said another percent of full energization for controlling the magnitude of energization of said oven in response to actuation of said starting means.

18. An oven in accordance with claim 17 wherein said second storage means comprises:
first additional register means operatively connected to said counter means for storing said further energization time therein, said further energization time being transferred from said first additional register means to said counter means in response to actuation of said starting means; and
second additional register means operatively connected to said register means for storing said further percent of full energization therein, said further percent of full energization being transferred from said second additional register means to said register means in response to actuation of said starting means.

* * * * *